UNITED STATES PATENT OFFICE.

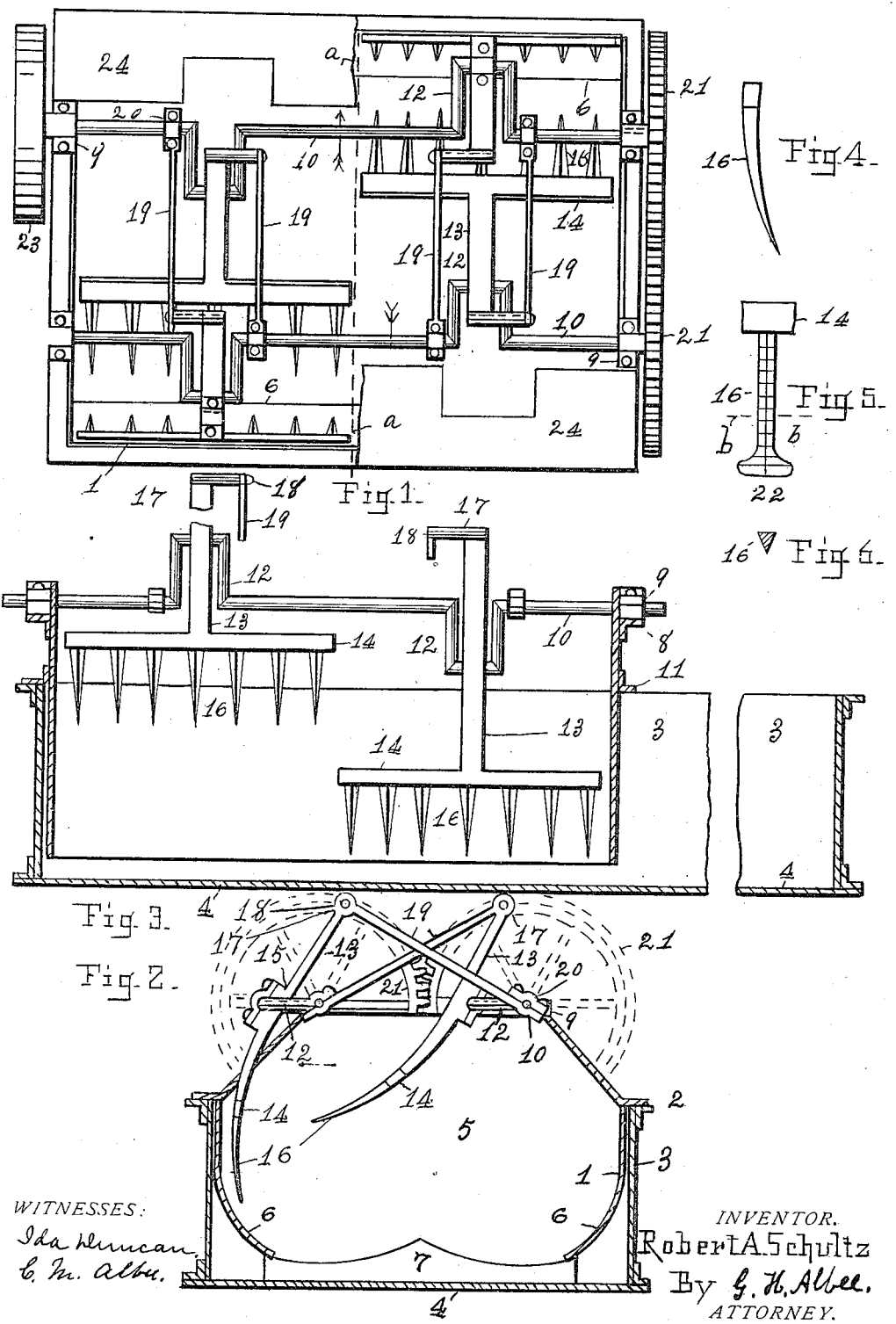

ROBERT A. SCHULTZ, OF MAPLE GROVE, WISCONSIN.

CHEESE-CURD MIXER.

1,045,896.  Specification of Letters Patent.  Patented Dec. 3, 1912.

Application filed January 15, 1912. Serial No. 671,336.

*To all whom it may concern:*

Be it known that I, ROBERT A. SCHULTZ, a citizen of the United States, residing at Maple Grove, in the county of Manitowoc and State of Wisconsin, have invented a new and useful Cheese-Curd Mixer, of which the following is a specification.

My invention relates to mechanism for cutting up and mixing cheese curd after it has been formed, and its object is, to lessen the manual labor in cheese making and to have the curd thoroughly mixed and the salt therein evenly distributed through the entire mass, the mechanism for doing this consisting of a vat into which the curd is placed after forming, the vat consisting of a skeleton frame of angle or other suitable bar iron with an open top and bottom in part, and sides and ends formed of sheet metal, and is to be placed near one end of the usual milk vat of a cheese factory. It is provided with a plurality of forks, two pairs being all that will be required in the usual cheese factory, but my invention is limited to no special number, which are arranged to be operated by cranks upon two shafts which are arranged for revolution in suitable journal boxes upon the curd mixing vat, for thoroughly mixing the curd. After the curd has been operated upon by the forks until it is in the desired condition, the curd mixing vat is lifted out of the outer vat by means of a suitable windlass or other mechanism, and placed out of the way of the workman until another batch of curd is ready to be operated upon, or to be cleaned up for use at another time as the case may require.

The mechanism is shown in the accompanying drawing, in which,—

Figure 1 is a plan of the mixing vat with its covered portion partly broken away, and with the forks of the device in the quarter stroke position or the cranks of its operating shafts in a horizontal position. Fig. 2 is vertical section of the curd mixing vat set into one end of a milk vat, and showing the forks of the device that are at one side of the line *a, a*, of Fig. 1. Fig. 3 is a longitudinal section, vertically, of the mixing vat within a milk vat, and showing the forks which are operated by its shafts, one fork at about its highest limit of movement and the other at its lowest limit, its driving pulley and gears being omitted. Fig. 4 is a side elevation of one of the fork tines upon a larger scale than previous figures. Fig. 5 is a front elevation of the same, and Fig. 6 is a cross section of the fork tine upon the line *b, b*, of Fig. 3.

Similar numerals indicate like parts in the several views.

1, indicates the curd mixing vat side walls which are provided with a flange 2, that rests upon the side walls 3, of a milk vat having a bottom 4, the curd mixing vat being a fraction of the length of the milk vat. The end wall 5, of the curd mixing vat is shown in Fig. 2 with a curved bottom 6, which fits down upon the curved false bottom 7, which is a separate structure and is to be placed upon the bottom of the milk vat before the mixing vat is placed therein. An angle iron 8, is provided upon which journal boxes 9, are mounted for supporting the crank shaft 10, and also, an angle iron 11, for supporting the mixing vat upon the milk vat, the shafts being each provided with cranks 12, upon which cranks the handles 13, of the fork heads 14, are supported in journal boxes 15. The forks may be of cast metal with the journal boxes integral therewith, and be provided with any suitable number of tines 16, and at the outer ends of their handles with a boss 17, for receiving a wrist pin 18. From each of these wrist pins a rod 19, extends to the opposite crank shaft and is provided with a journal box 20, for connecting the fork handle thereto. By thus suspending the fork from the crank and guiding its upper end by means of the rod 19, the fork tines enter the curd in a nearly vertical direction and produce a spading action upon the curd. The crank shafts are each provided with a gear wheel 21, in mesh with each other, and are arranged to be run in the direction of the arrows upon the shafts. The fork tines are shown in Figs. 1, 2 and 3, as being of a uniform taper from the head to its end 22, but a preferable form is shown in Figs. 4, 5 and 6, in which the end 22 is widened and made more like a spade, in which form the curd can be better mixed. The front of the tines are preferably to be of an acute angular form for the better cutting of the curd.

One of the crank shafts is to be provided with a driving pulley 23, by means of which the shafts may be driven from any suitable source of power.

The mixing vat may be made with a closed bottom of substantially the form shown by it and that of the false bottom, but a difficulty would then occur in the removal of the curd after the mixing had been completed on account of the shafts, mixing forks, &c., therefore I prefer to form the vat with a partially open bottom, place a false bottom under it and place both within another vat, and when the mixing is completed, lift the mixing vat and place it at one side, and letting the mixed curd drop into said outer vat from whence it can be put into the required forms for being pressed. The mixing vat being of considerable weight, mechanism of some kind, such as a windlass, will be required for lifting the mixing vat above the milk or outer vat, and if there is not sufficient space in the room for lifting it clear of the workman, mechanism will be required for transferring the mixing vat to one side of the outer vat, and for returning it to the outer vat for being cleaned for another day's use or for another batch, as the case may be.

It will be evident that a single shaft provided with crank or cranks and one or more forks arranged to be operated as herein shown, would mix the curd to some extent, but a more complete mixing can be produced with the arrangement as herein shown.

It may also be noted that the connection of the fork handles with the opposite shaft, is not essential, as with its connection with any fixed point upon the mixing vat frame, a substantially similar action of the fork will be produced.

A portion of the top of the mixing vat is provided with a cover 24, broken in Fig. 1 for showing the mechanism underneath, and is principally for strengthening the frame of the vat so that it can be successfully placed in and removed from the outer vat, and at such points as lie in the path of the movement of the cranks, openings can be left or hoods built around them.

Having described my invention, what I claim and desire to secure by Letters Patent, is,—

1. A cheese curd mixing device, consisting of a suitable vat for holding the curd to be operated upon, a shaft arranged for revolution in suitable journal boxes, upon said vat, a crank upon said shaft, a fork suspended from said crank, a fork handle extending upward from said fork, a wrist pin extending outward from one side of said handle, at the outer end thereof, a connecting rod journaled at one end upon said wrist pin and at the other upon a suitable fixed part of the mixing device.

2. A cheese curd mixing device, consisting of a suitable vat for holding the curd to be operated upon, two shafts arranged for revolution parallel with each other in suitable journal boxes, means for revolving one of said shafts, a gear wheel upon each shaft in mesh with each other and arranged to revolve said shafts at a uniform speed in a direction from each other, one or more cranks upon each shaft, a fork for each crank, a handle extending upward from each fork, a journal box upon each handle intermediate its ends mounted upon one of said cranks, a boss upon the outer end of each handle, a wrist pin extending outward from each boss at one side of said handle, a connecting rod for each boss mounted at one end upon a wrist pin and at the other upon a suitable fixed point upon the curd mixing device.

3. In a cheese curd mixing device, a vat for holding the curd to be mixed, comprising a skeleton frame formed of suitable bar iron, side and end walls, and a bottom formed of sheet metal covering a portion along and adjoining its side walls, curved to correspond with the requirements of its internal mechanism, in combination with a false bottom detached from said mixing vat and consisting of a flat bottom adapted to fit upon a flat bottomed vat and its upper surface curved outwardly each side of its longitudinal center, upon a similar but larger curve than that of the bottom sections aforesaid of the curd mixing vat, and an outer vat in which said mixing vat and false bottom are adapted to be supported.

4. In a cheese curd mixing vat, a shaft mounted for revolution thereon, a crank upon said shaft, a fork arranged to be operated by said crank for mixing the curd, the tines of said fork along their front being an acute angle and its outer ends widened and sharpened into a spade like form.

5. A cheese curd mixing device, comprising a suitable vat for holding the curd to be operated upon, a shaft arranged for revolution in suitable journal boxes upon said vat, a crank upon said shaft, a fork for mixing the curd, a plurality of tines upon said fork curved toward said shaft, said fork being arranged to be operated by said crank and to enter the curd upon a curve, to cut the same, lift it and let it drop to the surface of the curd in said vat.

ROBERT A. SCHULTZ.

Witnesses:
E. KLEINHAUS,
EDITH NUSSBICKER.

Copies of this patent may be obtained for five cents each, by addressing the "Commissioner of Patents, Washington, D. C."